US011583137B1

(12) United States Patent
Todd et al.

(10) Patent No.: US 11,583,137 B1
(45) Date of Patent: Feb. 21, 2023

(54) COOKTOP APPLIANCE AND SENSOR ASSEMBLY FOR A GRIDDLE

(71) Applicant: Haier US Appliance Solutions, Inc., Wilmington, DE (US)

(72) Inventors: Justin Patrick Todd, Louisville, KY (US); Rafael Martinez, Santiago de Querétaro (MX)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/392,629

(22) Filed: Aug. 3, 2021

(51) Int. Cl.
*A47J 37/06* (2006.01)
*F24C 3/08* (2006.01)
*F24C 3/12* (2006.01)
*G01K 13/02* (2021.01)
*G01K 1/14* (2021.01)
*F24C 15/10* (2006.01)

(52) U.S. Cl.
CPC ............ *A47J 37/0682* (2013.01); *F24C 3/085* (2013.01); *F24C 3/126* (2013.01); *G01K 1/14* (2013.01); *G01K 13/028* (2013.01); *F24C 15/10* (2013.01); *G01K 2207/00* (2013.01)

(58) Field of Classification Search
CPC ....... A47J 37/0682; F24C 3/085; F24C 3/126; F24C 15/107; G01K 1/14; G01K 13/028; F23N 2225/16

USPC ...... 126/39 E, 39 G, 39 H, 39 J, 39 K, 39 N, 126/39 R, 42
See application file for complete search history.

(56) References Cited

U.S. PATENT DOCUMENTS

| 5,151,574 | A | * | 9/1992 | Urban | B23K 3/047 |
| | | | | | 374/185 |
| 6,371,011 | B1 | | 4/2002 | Kuechler | |
| 8,074,563 | B2 | | 12/2011 | Bowles | |
| 8,413,648 | B2 | | 4/2013 | Querejeta Andueza et al. | |
| 9,980,321 | B2 | | 5/2018 | Dimarco | |
| 10,386,075 | B2 | | 8/2019 | Cadima | |
| 2009/0165778 | A1 | | 7/2009 | Harter | |
| 2021/0148575 | A1 | * | 5/2021 | Cadima | F24C 3/027 |

FOREIGN PATENT DOCUMENTS

| CN | 205107431 U | 3/2016 |
| EP | 2626638 B1 | 8/2018 |

* cited by examiner

*Primary Examiner* — Vivek K Shirsat
(74) *Attorney, Agent, or Firm* — Dority & Manning, P.A.

(57) ABSTRACT

A cooktop appliance or griddle assembly may include a cooking platter, a spring-loaded platform, and a sensor body. The cooking platter may define a top surface and a bottom surface. The spring-loaded platform may be mounted below the cooking platter. The sensor body may be attached to the spring-loaded platform in biased conductive engagement with bottom surface.

20 Claims, 5 Drawing Sheets

COOKTOP APPLIANCE AND SENSOR ASSEMBLY FOR A GRIDDLE

FIELD OF THE INVENTION

The present subject matter relates generally to cooktop appliances, and more particularly to griddles for a cooktop appliance having one or more temperature sensor for controlling the same.

BACKGROUND OF THE INVENTION

Cooktop appliances generally include one or more heating zones having heating elements or burners for heating the same. For instance, a griddle defining a cooking surface may be included for cooking food items directly on the cooking surface. Often, a griddle plate or cooking surface is removable from the rest cooktop appliance, such as for easy cleaning.

Increasingly, there is a demand to provide a means for detecting or estimating the temperature of an appliance's cooking surface. In particular, having an accurate measurement of the cooking surface may permit a user to more consistently or effectively cook food items. In some instances, an appliance may include one or more features for automatically controlling heat to the cooking surface based on a detected or estimated temperature (e.g., without direct user input or adjustments to the heat output).

Certain challenges remain with existing cooktop appliances. For instance, it can be difficult to ensure the accuracy of temperature measurements for a cooking surface. It is common for a temperature sensor to be mounted apart from the griddle plate or cooking surface of a griddle. This arrangement may hinder accuracy or precession of any temperature measurements for the cooking surface. Attempts have been made to mount a temperature sensor directly to the griddle plate (e.g., on a bottom surface of the griddle plate). However, such attempts present their own drawbacks. For instance, such arrangements may be cumbersome and interfere with any service or cleaning that requires removing the griddle plate from the rest of the appliance. Additionally or alternatively, existing arrangements may be more easily damaged, such as when a user moves the cooking surface too quickly or too far from the cabinet without detaching the temperature sensor from the griddle plate.

As a result, it would be useful to provide an assembly or appliance addressing one or more of the above issues. For instance, it may be advantageous to provide an assembly or appliance capable of consistently detecting accurate or precise measurements. It may be especially useful if such an assembly or appliance could prevent damage (e.g., to a sensor) or avoid affixing a sensor directly to a cooking surface (i.e., plate or platter defining the same).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a griddle assembly is provided. The griddle assembly may include a cooking platter, a spring-loaded platform, and a sensor body. The cooking platter may define a top surface and a bottom surface. The spring-loaded platform may be mounted below the cooking platter. The sensor body may be attached to the spring-loaded platform in biased conductive engagement with bottom surface.

In another exemplary aspect of the present disclosure, a cooktop appliance is provided. The cooktop appliance may include a cabinet, a cooking platter, a griddle box, a spring-loaded platform, and a sensor body. The cooking platter may be selectively disposed on the cabinet. The cooking platter may define a top surface and a bottom surface. The griddle box may be mounted to the cabinet below the cooking platter. The spring-loaded platform may be mounted to the griddle box apart from the cooking platter. The sensor body may be attached to the spring-loaded platform in biased conductive engagement with bottom surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
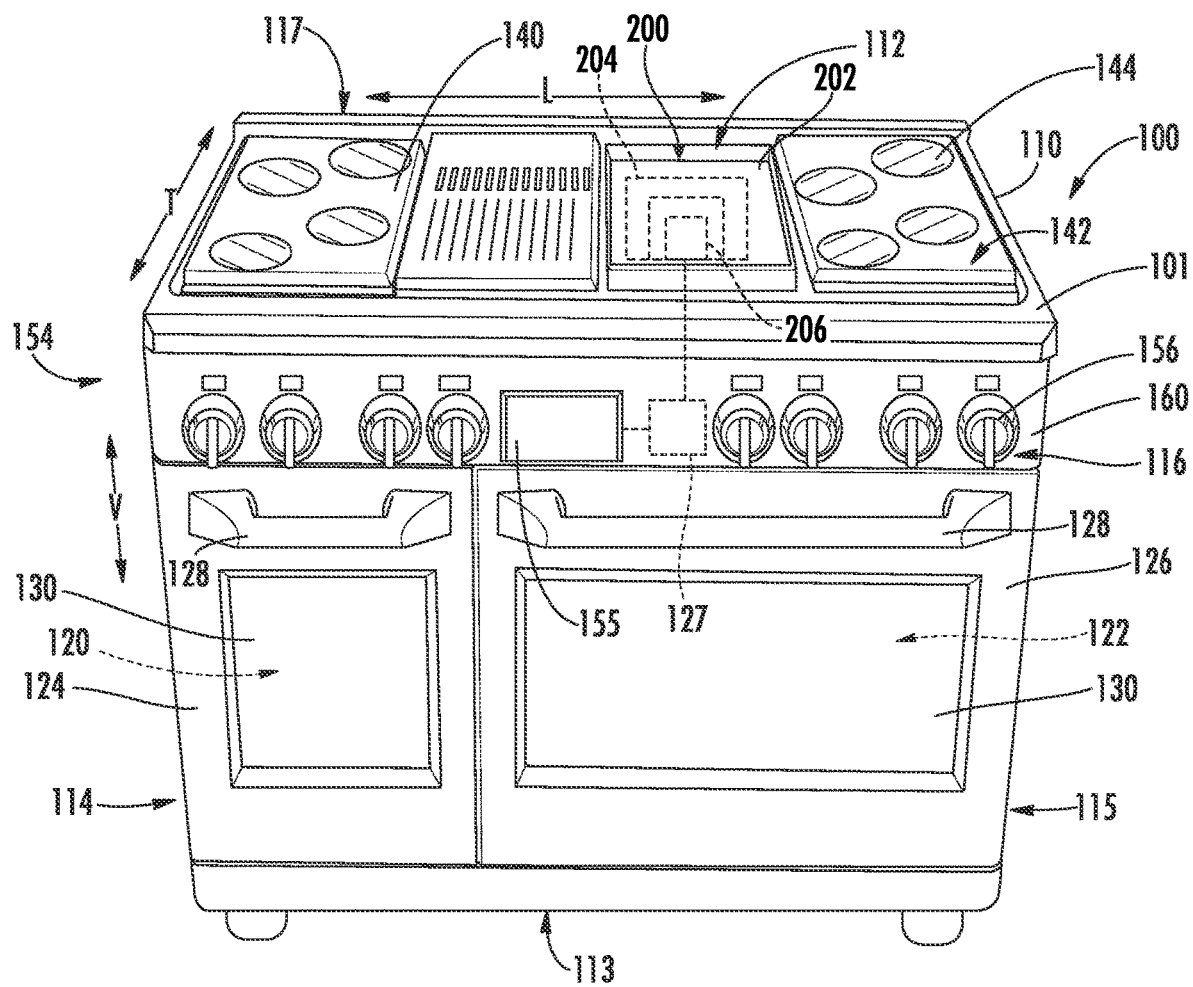
FIG. 1 provides a perspective view of a cooktop appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The terms "coupled," "fixed," "attached to," and the like refer to both direct coupling, fixing, or attaching, as well as indirect coupling, fixing, or attaching through one or more intermediate components or features, unless otherwise specified herein. Terms such as "left," "right," "front," "back," "top," or "bottom" are used with reference to the perspective of a user accessing the cooktop appliance. For example, a user stands in front of the cooktop appliance to open the doors and reaches into the cooking chamber(s) to access items therein.

Figure 2:
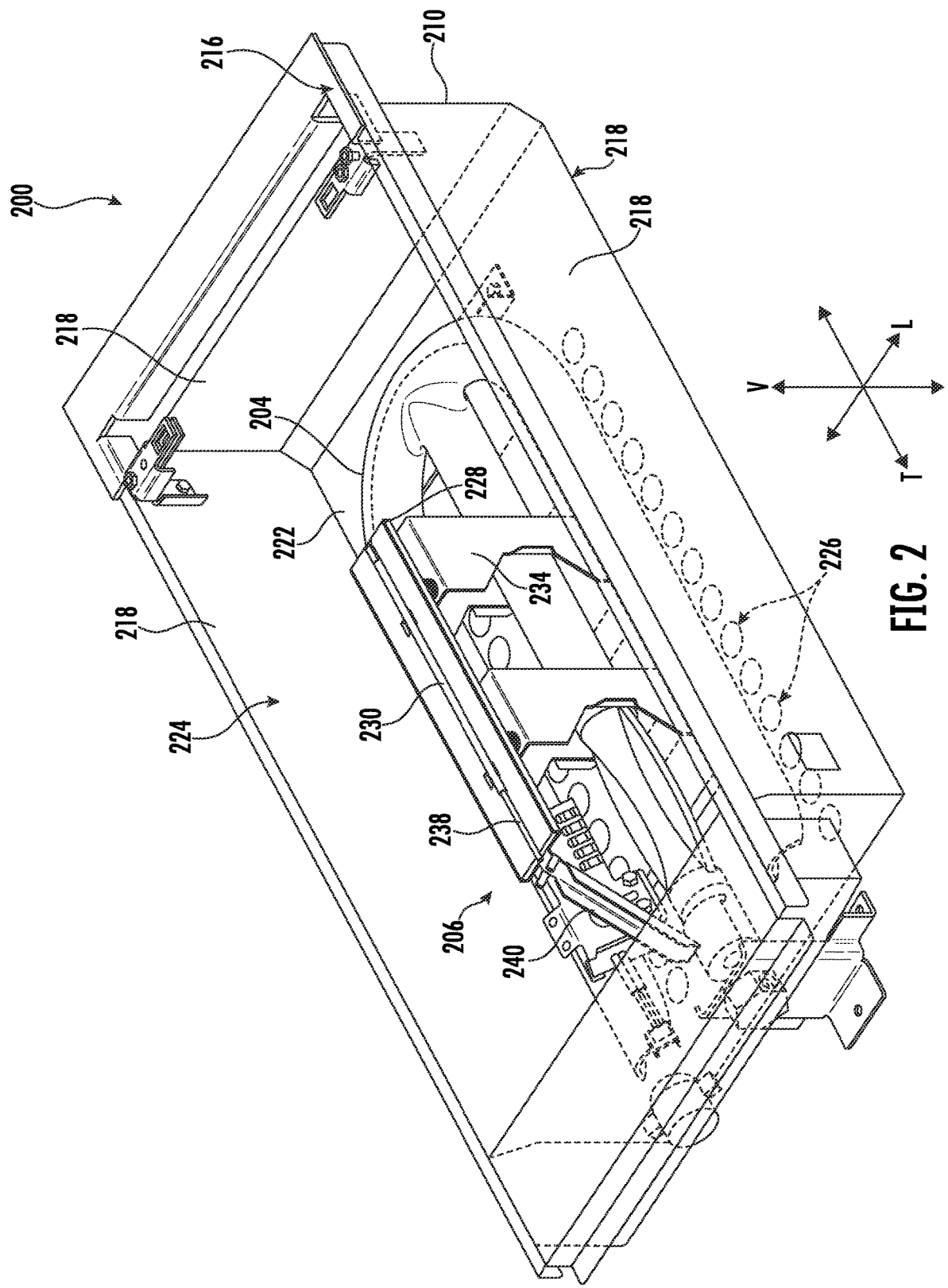
FIG. 2 provides a perspective view of a portion of a griddle assembly for a cooktop appliance according to exemplary embodiments of the present disclosure.

Turning now to the figures, FIG. 1 provides a front, perspective view of an oven or cooktop appliance 100 as may be employed with the present disclosure. FIG. 2 provides an elevation view of a top portion or region of cooktop appliance 100. Cooktop appliance 100 includes an insulated cabinet housing or cabinet 110. As shown, cooktop appliance 100 defines a vertical direction V, a lateral direction L, and a transverse direction T (e.g., at cabinet 110). The vertical direction V, lateral direction L, and transverse direction T are mutually perpendicular and form an orthogonal direction system.

Cabinet 110 generally configured for containing or supporting various components of appliance 100 and which may also define one or more internal chambers or compartments of appliance 100. In this regard, as used herein, the terms "cabinet," "housing," and the like are generally intended to refer to an outer frame or support structure for appliance 100 (e.g., including any suitable number, type, and configuration of support structures formed from any suitable materials, such as a system of elongated support members, a plurality of interconnected panels, or some combination thereof). It should be appreciated that cabinet 110 does not necessarily require an enclosure and may simply include open structure supporting various elements of appliance 100. Optionally, cabinet 110 may enclose some or all portions of an interior of cabinet 110. It should be appreciated that cabinet 110 may have any suitable size, shape, and configuration while remaining within the scope of the present subject matter.

As shown, cabinet 110 extends along the vertical direction V between a top portion 112 and a bottom portion 113; along the lateral direction L between a left side portion 114 and a right side portion 115; and along the traverse direction T between a front portion 116 and a rear portion 117. In some embodiments, cabinet 110 defines multiple discrete cooking chambers, such as a first or left cooking chamber 120 and a second or right cooking chamber 122. Thus, cooktop appliance 100 may generally referred to as a double oven range appliance. As will be understood by those skilled in the art, cooktop appliance 100 is provided by way of example only, and the present subject matter may be used in any suitable appliance (e.g., a single-chamber range appliance or a stand-alone cooktop appliance). Thus, the example embodiments illustrated in the present figures are not intended to limit the present disclosure matter to any particular appliance configuration or arrangement, except as otherwise indicated.

Left and right cooking chambers 120 and 122 are configured for the receipt of one or more food items to be cooked. Cooktop appliance 100 may include a left door 124 and a right door 126 rotatably attached to cabinet 110 in order to permit selective access to left cooking chamber 120 and right cooking chamber 122, respectively. Handles 128 are mounted to left and right doors 124 and 126 to assist a user with opening and closing doors 124 and 126 in order to access cooking chambers 120 and 122. As an example, a user can pull on the handle 128 mounted to left door 124 to open or close left door 124 and access left cooking chamber 120. Glass window panes 130 may be provide for viewing the contents of left and right cooking chambers 120 and 122 when doors 124 and 126 are closed and also assist with insulating the cooking chambers 120 and 122. Heating elements (not shown), such as electric resistance heating elements, gas burners, microwave heating elements, halogen heating elements, or suitable combinations thereof, may be positioned within left cooking chamber 120 and right cooking chamber 122 for heating left cooking chamber 120 and right cooking chamber 122, as would be understood As shown, cooktop appliance 100 includes a cooktop 140. Cooktop 140 may be positioned at or adjacent a top portion of cabinet 110. In the illustrated embodiments, cooktop 140 is positioned above left and right cooking chambers 120 and 122. Cooktop 140 includes a top panel 142. By way of example, top panel 142 may be constructed of glass, ceramics, enameled steel, and combinations thereof.

For cooktop appliance 100, a utensil (not pictured) holding food or cooking liquids (e.g., oil, water, etc.) may be placed onto one or more of burner assemblies 144 (e.g., on a cooking grate). Burner assemblies 144 provide thermal energy to cooking utensils thereon. As shown in FIG. 1, burners assemblies 144 can be configured in various sizes so as to provide e.g., for the receipt of cooking utensils (e.g., pots, pans, etc.) of various sizes and configurations and to provide different heat inputs for such cooking utensils.

Separate from or in addition to burner assemblies 144, a griddle assembly 200 may be provided, such as to cook one or more food items directly thereon. Generally, griddle assembly 200 includes a cooking platter 202 mounted in thermal communication with a heating element 204 (e.g., gas burner), which can be selectively activated to heat or otherwise provide thermal energy to cooking platter 202 (e.g., and one or more food items thereon). As will be described in greater detail below, a sensor assembly 206 may be included with griddle assembly 200 (e.g., to monitor or selectively control the heat or temperature at cooking platter 202).

In some embodiments, user interface or control panel 154 is located within convenient reach of a user of the cooktop appliance 100. For some example embodiments, user interface panel 154 includes a front panel 160 disposed on the front portion 116 of cabinet 110. As shown, front panel 160 may be mounted to cabinet 110. Moreover, user interface panel 154 may include one or more knobs 156 that are each associated with one of burner assemblies 144. Knobs 156 allow the user to activate each burner assembly and determine the amount of heat input provided by each burner assembly 144 to a cooking utensil located thereon. User interface panel 154 may also be provided with one or more graphical displays 155 that deliver certain information to the user such as, for example, whether a particular burner assembly is activated or the rate at which the burner assembly is set.

Although shown with knobs 156, it should be understood that knobs 156 and the configuration of cooktop appliance 100 shown in FIG. 1 is provided by way of example only. More specifically, user interface panel 154 may include various input components, such as one or more of a variety of touch-type controls, electrical, mechanical or electromechanical input devices including rotary dials, push buttons, and touch pads. Optionally, the graphical display 155 may be provided as a touch screen interface configured to receive input commands from a user (e.g., via a capacitive touch panel). Moreover, the user interface panel 154 may include other display components, such as a digital or analog display device designed to provide operational feedback to a user.

Cooktop appliance 100 may further equipped with a controller 127 to regulate operation of the cooktop appliance 100. For example, controller 127 may regulate the operation of one or more portions of cooktop appliance 100, such as the burner assemblies 144, griddle assembly 200, user interface 154, etc. Controller 127 may be in communication (via, for example, a suitable wired or wireless connection) with user interface 154 (e.g., at graphical display 155 or knobs 156).

In general, controller 127 may be operable to configure the cooktop appliance 100 (and various components thereof) for cooking. Such configuration may be based on a plurality of cooking factors of a selected operating cycles, sensor feedback, etc. By way of example, controller 127 may include one or more memory devices 148 and one or more processors 150, such as general or special purpose microprocessors operable to execute programming instructions or micro-control code associated with an operating cycle. The memory 148 may represent random access memory such as DRAM, or read only memory such as ROM or FLASH. In one embodiment, the processor 150 executes programming instructions stored in memory 148. The memory 148 may be a separate component from the processor 150 or may be included onboard within the processor 150. The memory 148 can store information accessible to processor 150, including instructions that can be executed by processor 150. Optionally, the instructions can be software or any set of instructions that when executed by the processor 150, cause the processor 150 to perform operations. For certain embodiments, the instructions include a software package configured to operate appliance 100 and execute certain tasks.

Controller 127 may be positioned in a variety of locations throughout cooktop appliance 100. As an example, one or more portions of controller 127 may be located within a user interface panel 154 of cooktop appliance 100. In such an embodiment, input/output ("I/O") signals may be routed between the control system and various operational components of cooktop appliance 100 along wiring harnesses that may be routed through cabinet 110. Optionally, controller 127 is in communication with user interface panel 154 through which a user may select various operational features and modes and monitor progress of cooktop appliance 100. In example embodiments, user interface panel 154 may represent a general purpose I/O ("GPIO") device or functional block.

In some embodiments, controller 127 is in operative communication with sensor assembly 206 (e.g., at a sensor body 230 thereof). Controller 127 may be configured to control or direct one or more heating elements 204 (e.g., gas burner) based on a detected temperature. As an example, controller 127 may direct the heating element 204 of griddle assembly 200 based on temperature signals received from sensor assembly 206 (e.g., at a sensor body 230 thereof). Optionally, controller 127 may execute a closed-loop cycle to maintain temperature for cooking platter 202 at a set temperature value (e.g., selected by a user), such as by directing or adjusting heat output from heating element 204 according to temperature measurements made by (i.e., temperature signals received from) sensor assembly 206, as would be understood in light of the present disclosure.

Turning now broadly to FIGS. 1 through 5, FIGS. 2 through 5 provide various views of griddle assembly 200 (i.e., one or more portions thereof). As noted above, griddle assembly 200 includes a cooking platter 202, a heating element 204, and a sensor assembly 206. A frame or griddle box 210 (e.g., fixed or mounted to cabinet 110—FIG. 1) may support one or more elements of griddle assembly 200, as will be described in greater detail below.

Generally, cooking platter 202 provides a rigid surface or area on which food items may be received and heated. Specifically, cooking platter 202 defines a top surface 212 directed upward to hold or support one or more food items. Top surface 212 may be defined as a flat or planar cooking surface that is generally solid or free of any holes such that a variety of loose or amorphous food items (e.g., eggs, rice, liquid batter, etc.) may be held thereon. Opposite of top surface 212, a bottom surface 214 of cooking platter 202 may be defined. Thus, bottom surface 214 may be directed downward (e.g., to receive heat from heating element 204, which can be conducted through cooking platter 202 to top surface 212). The region of cooking platter 202 between bottom surface 214 and top surface 212 may be solid or continuous such that heat is readily conducted through cooking platter 202. As would be understood, cooking platter 202 may be formed from any suitable material, such as a solid metal plate or sheet.

In some embodiments, cooking platter 202 is selectively disposed on cabinet 110. For instance, cooking platter 202 may be received on a predefined region of cabinet 110, such as at the top panel 142. As an example, cooking platter 202 may be removably received in a mounting groove defined about the top end 216 of griddle box 210. Additionally or alternatively, a radial rim may extend (e.g., directly) from cooking platter 202 to support or hold cooking platter 202 on the top end 216 of griddle box 210.

Griddle box 210 may be provided or generally located below cooking platter 202. In particular, griddle box 210 may be mounted to cabinet 110. Griddle box 210 may further be fixed relative to the rest of cabinet 110. As shown, griddle box 210 includes one or more box walls (e.g., sidewalls 220 and bottom wall 222) that define a box chamber 224 beneath cooking platter 202. In the illustrated embodiments, griddle box 210 extends vertically between a top end 216 and a bottom end 218. Bottom wall 222 extends along or proximal to bottom end 218 (e.g., to delineate the base of box chamber 224). Optionally, one or more apertures 226 may be defined through bottom wall 222, such as to permit airflow to box chamber 224 or a heating element 204 therein. Sidewalls 220 extend upward from bottom wall 222 to the top end 216 and may generally define a vertical opening to box chamber 224. Thus, box chamber 224 may be open at the top end 216 while being closed at the bottom end 218.

When assembled, cooking platter 202 may extend over and across the vertical opening of griddle box 210, thereby closing box chamber 224 and preventing box chamber 224 from being accessed or viewed (e.g., by a user). Nonetheless, a user may be permitted to easily (e.g., without the use of any tools) remove cooking platter 202 from cabinet 110, such as to clean cooking platter 202 or access box chamber 224.

Within griddle box 210, one or more heating elements 204, such as a gas burner, may be housed. In other words, heating elements 204 may be disposed below or beneath cooking platter 202, such as within box chamber 224. As would be understood, such heating elements 204 may be selectively activated or directed to generate heat within griddle box 210, thereby heating bottom surface 214 in order to heat top surface 212 (and any food items or utensils thereon).

Separate from or in addition to a heating element 204, sensor assembly 206 may be mounted below cooking platter 202. Specifically, sensor assembly 206, including at least one spring-loaded platform 228 and at least one sensor body 230 may be housed within griddle box 210 or box chamber 224 to hold one or more sensors, such as a temperature sensor, against bottom surface 214.

Spring-loaded platform 228 is generally mounted within griddle box 210 to move resiliently relative to griddle box 210 or cabinet 110. For instance, spring-loaded platform 228 may be slidably disposed within griddle box 210. One or more spring bodies 232 (e.g., compression springs, leaf springs, torsion springs, hydraulic springs, pneumatic springs, etc.) may be provided to bias spring-loaded platform 228 (e.g., upward).

In some embodiments, a rigid base 234 (e.g., including one or more legs) is disposed below spring-loaded platform 228 to support the same. For instance, rigid base 234 may be fixed to griddle box 210, such as at the bottom wall 222. When assembled, rigid base 234 may extend upward (e.g., above heating element 204) such that spring-loaded platform 228 is held above the bottom end 218 of griddle box 210 or above any heating element 204 therein. Optionally, the spring bodies 232 may be disposed between the rigid base 234 and the spring-loaded platform 228, the spring bodies 232 biasing the spring-loaded platform 228 upward away from the rigid base 234. The rigid base 234 may, thus, remain static within box chamber 224 while the spring-loaded platform 228 is permitted to move in a predefined direction (e.g., vertically) relative to cabinet 110 while remaining attached to the same (e.g., via griddle box 210 and rigid base 234).

As noted above, sensor body 230 is generally attached to spring-loaded platform 228, such as by one or more mechanical fasteners, adhesives, or friction fitted portions. Optionally, an insulation pad 236 (e.g., formed from suitable high-temperature insulator, such as an insulating fabric, matting, or foam) may be disposed between the spring-loaded platform 228 and the sensor body 230. In some such embodiments, a recess formed within insulation pad 236 hold sensor body 230 while one or more mechanical fasteners (e.g., clips, prongs, screws, bolts, etc.) secure insulation pad 236 to spring-loaded platform 228. Notably, insulation pad 236 may restrict heat conduction to sensor body 230 through spring-loaded platform 228, ensuring temperatures detected at sensor body 230 correspond to heat directed through cooking platter 202.

Figure 3:
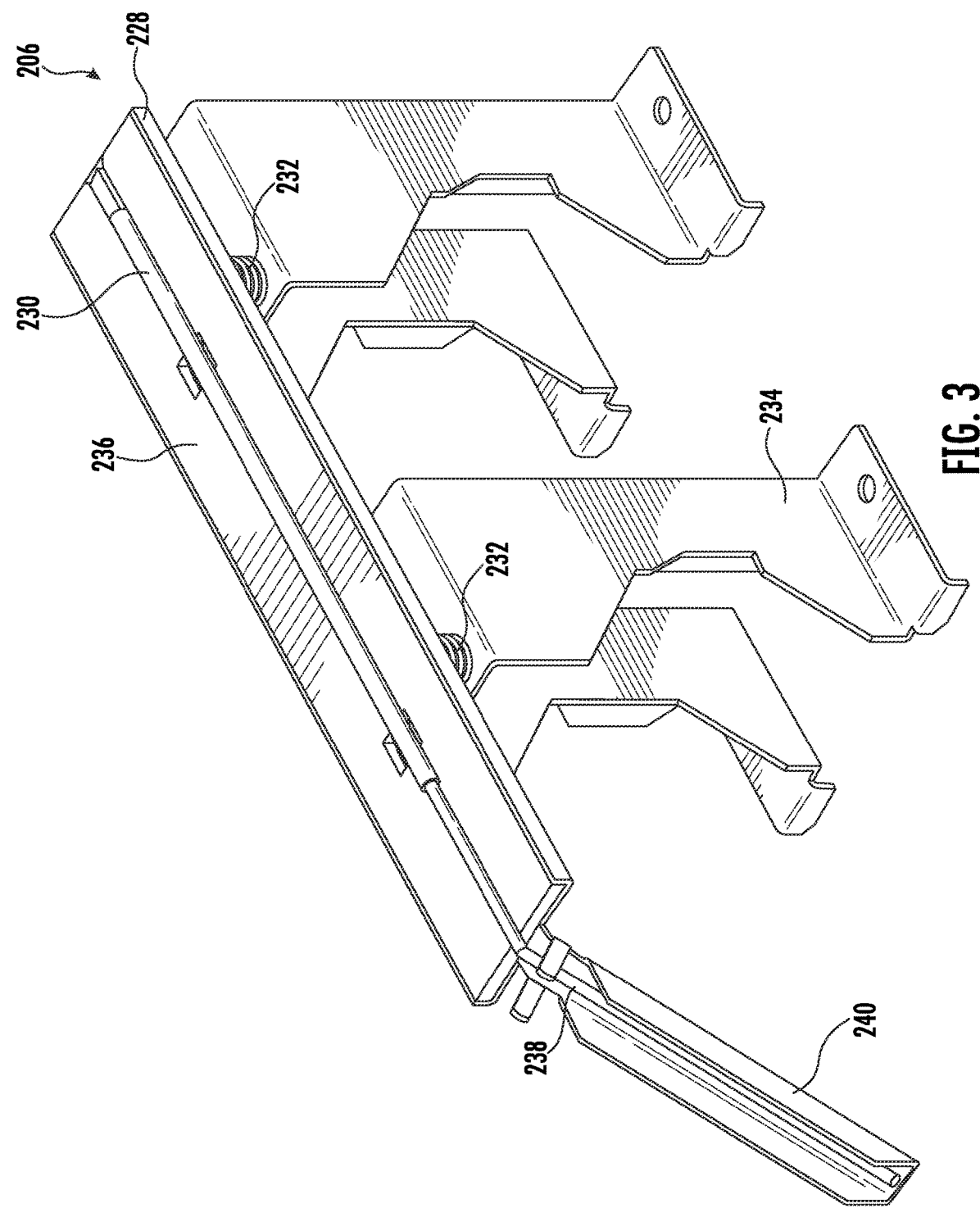
FIG. 3 provides a perspective view of the sensor assembly of the exemplary griddle assembly of FIG. 2.
Figure 4:
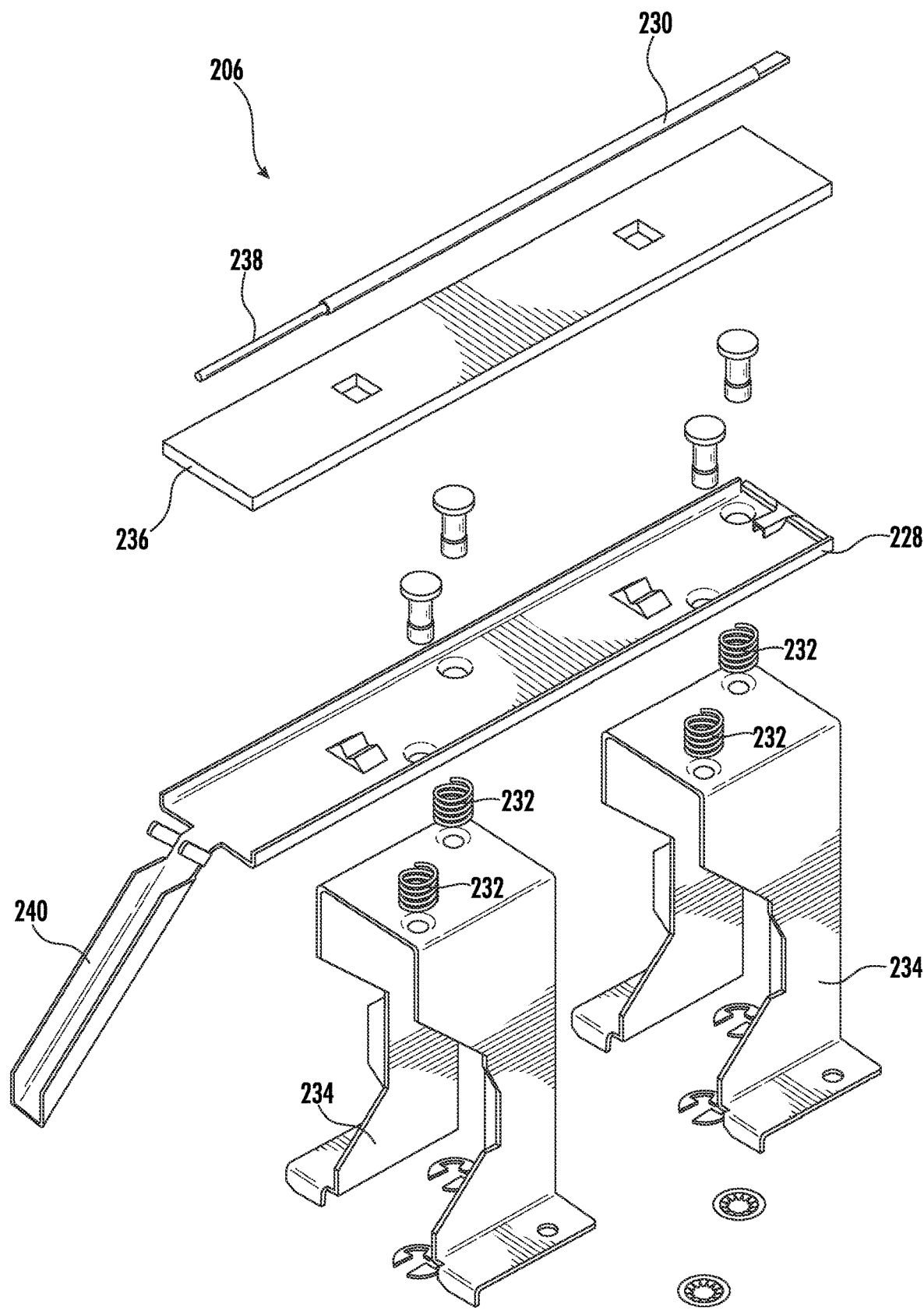
FIG. 4 provides an exploded perspective view of the exemplary sensor assembly of FIG. 3.
Figure 5:
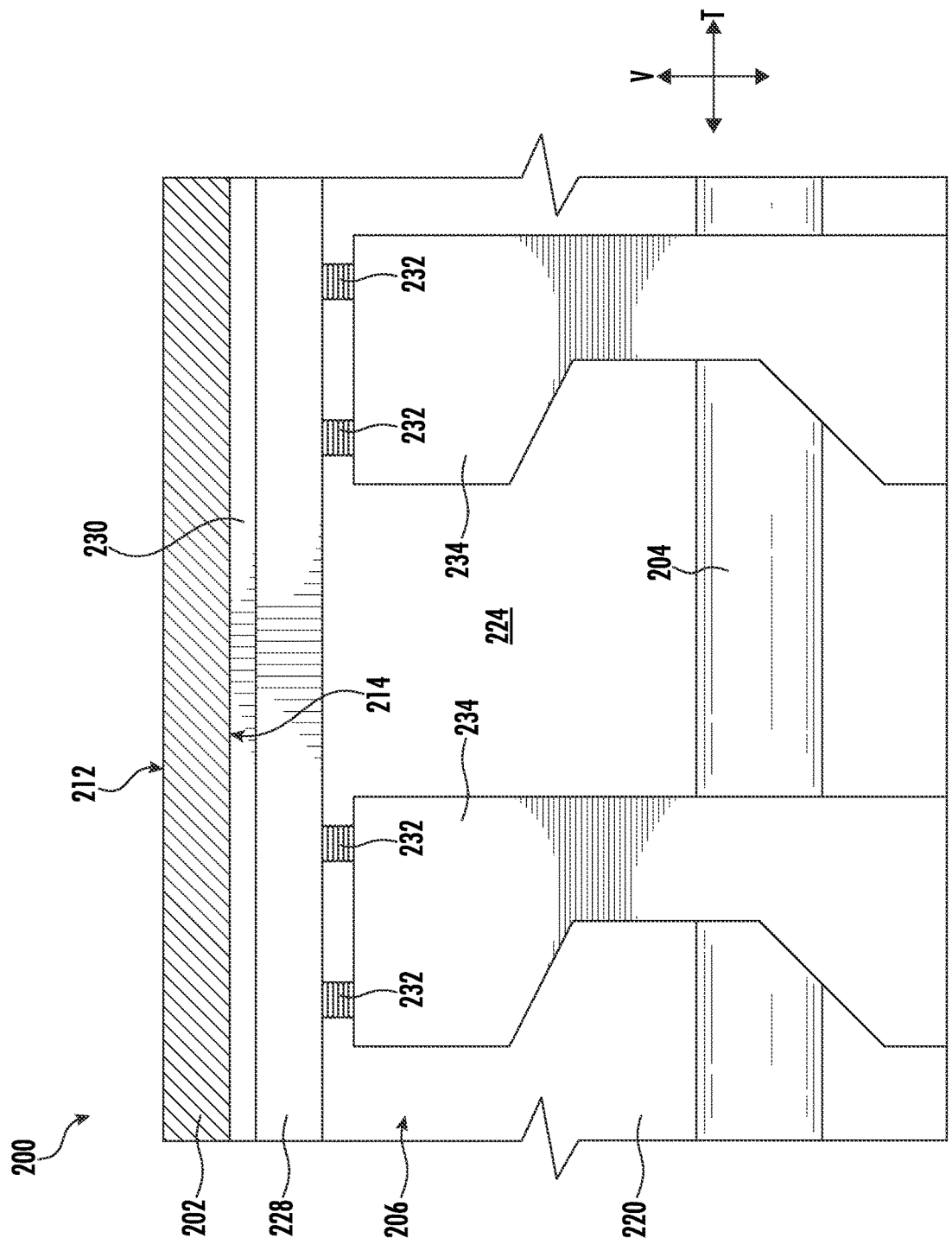
FIG. 5 provides a sectional, side, elevation view of a portion of a griddle assembly for a cooktop appliance according to exemplary embodiments of the present disclosure.

In some embodiments, sensor body 230 includes or is formed as part of a temperature sensor. Sensor body 230 may thus include or be provided as a temperature probe or bulb (e.g., as shown). Furthermore, one or more wires or tubes (e.g., a capillary or sensor tube 238) may extend from sensor body 230 (e.g., to connect sensor body 230 to controller 127 or a thermostatic switch thereof). Optionally, a tube ramp 240 may be attached to the spring-loaded platform 228 and directed downward therefrom away from the bottom surface 214 of cooking platter 202. Sensor tube 238 may be disposed within or along the tube ramp 240, apart from cooking platter 202, as illustrated in FIG. 3—it is noted that a portion of 238 has been omitted in FIGS. 2 and 4 simply for the purposes of illustration and clarity, but should be understood to lie within tube ramp 240.

When assembled, sensor body 230 is attached to spring-loaded platform 228 and is biased upward (e.g., toward cooking platter 202). Specifically, sensor body 230 may biased into conductive engagement with the bottom surface 214 of cooking platter 202, thereby sandwiching sensor body 230 between bottom surface 214 and spring-loaded platform 228. Together, spring-loaded platform 228 and sensor body 230 may define a predefined range of motion (e.g., vertical range of motion) to move up and down relative to the rest of griddle box 210, as motivated by weight or pressure applied on top of spring-loaded platform 228. In some embodiments, the upper point for this range of motion may generally be located above the top end 216 of griddle box 210 or otherwise above a point to be occupied by the bottom surface 214 of cooking platter 202. Thus, placing cooking platter 202 onto cabinet 110 (e.g., at griddle box 210) may force bottom surface 214 onto sensor body 230 or motivate spring-loaded platform 228 downward.

Cooking platter 202 itself may be mechanically independent from cabinet 110, griddle box 210, or sensor assembly 206. Cooking platter 202 may thus freely move off of and relative to cabinet 110, griddle box 210, or sensor assembly 206 (e.g., for cleaning or permitting access to box chamber 224). Specifically, it may be notable that there are no permanent or temporary attachment elements holding cooking platter 202 to cabinet 110 that might otherwise fix cooking platter 202 to cabinet 110 or box griddle and prevent a user from lifting cooking platter 202 from the rest of griddle assembly 200 (e.g., while still operating with conductive engagement between sensor assembly 206 and cooking platter 202). In some such embodiments, cooking platter 202 is mechanically independent from sensor assembly 206 and is notably permitted to move relative to cabinet 110 and to sensor assembly 206 (e.g., without causing or requiring similar movement of sensor assembly 206).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A griddle assembly comprising:
    a cooking platter defining a top surface and a bottom surface;
    a griddle box mounted below the cooking platter, the griddle box defining a box chamber;
    a spring-loaded platform mounted below the cooking platter;
    a sensor body attached to the spring-loaded platform in biased conductive engagement with bottom surface;
    a rigid base fixed to the griddle box within the box chamber and extending upward below the spring-loaded platform; and
    a spring body supported on the rigid base and disposed between the rigid base and the spring-loaded platform, the spring body being vertically movable relative to the rigid base, the spring body biasing the spring-loaded platform upward away from the rigid base.

2. The griddle assembly of claim 1, further comprising:
    a gas burner mounted below the sensor body to heat the cooking platter.

3. The griddle assembly of claim 2, further comprising:
    a controller in operative communication with the sensor body and the gas burner, and wherein the controller is configured to direct the gas burner based on one or more temperature signals received from the sensor body.

4. The griddle assembly of claim 1, wherein the cooking platter is mechanically independent from the sensor body to be movable relative to the sensor body.

5. The griddle assembly of claim 1, wherein the sensor body comprises a temperature probe or bulb.

6. The griddle assembly of claim 1, wherein the griddle box comprises a bottom wall, and wherein the rigid base is fixed directly to the bottom wall and extends upwardly therefrom.

7. The griddle assembly of claim 1, further comprising:
a tube ramp attached to the spring-loaded platform and directed downward therefrom away from the bottom surface; and
a sensor tube extending from the sensor body along the tube ramp.

8. The griddle assembly of claim 1, further comprising:
an insulation pad disposed between the spring-loaded platform and the sensor body.

9. A cooktop appliance comprising:
a cabinet;
a cooking platter selectively disposed on the cabinet, the cooking platter defining a top surface and a bottom surface;
a griddle box mounted to the cabinet below the cooking platter, the griddle box defining a box chamber;
a spring-loaded platform mounted to the griddle box apart from the cooking platter;
a sensor body attached to the spring-loaded platform in biased conductive engagement with bottom surface;
a rigid base fixed to the griddle box within the box chamber and extending upward below the spring-loaded platform; and
a spring body supported on the rigid base and disposed between the rigid base and the spring-loaded platform, the spring body being vertically movable relative to the rigid base, the spring body biasing the spring-loaded platform upward away from the rigid base.

10. The cooktop appliance of claim 9, further comprising:
a gas burner mounted below the sensor body to heat the cooking platter.

11. The cooktop appliance of claim 10, further comprising:
a controller in operative communication with the sensor body and the gas burner, and wherein the controller is configured to direct the gas burner based on one or more temperature signals received from the sensor body.

12. The cooktop appliance of claim 9, wherein the cooking platter is mechanically independent from the cabinet and the sensor body to be movable relative to the cabinet and the sensor body.

13. The cooktop appliance of claim 9, wherein the sensor body comprises a temperature probe or bulb.

14. The cooktop appliance of claim 9, wherein the griddle box comprises a bottom wall, and wherein the rigid base is fixed directly to the bottom wall and extends upwardly therefrom.

15. The cooktop appliance of claim 9, further comprising:
a tube ramp attached to the spring-loaded platform and directed downward therefrom away from the bottom surface; and
a sensor tube extending from the sensor body along the tube ramp.

16. The cooktop appliance of claim 9, further comprising:
an insulation pad disposed between the spring-loaded platform and the sensor body.

17. A cooktop appliance comprising:
a cabinet;
a cooking platter selectively disposed on the cabinet, the cooking platter defining a top surface and a bottom surface;
a griddle box mounted to the cabinet below the cooking platter, the griddle box defining a box chamber;
a spring-loaded platform mounted to the griddle box apart from the cooking platter and within the box chamber;
a sensor body attached to the spring-loaded platform in biased conductive engagement with bottom surface, the sensor body comprising a temperature probe or bulb;
a gas burner mounted within the griddle box below the sensor body to heat the cooking platter;
a rigid base fixed to the griddle box within the box chamber and extending upward below the spring-loaded platform;
a plurality of spring bodies supported on the rigid base and disposed between the rigid base and the spring-loaded platform, the spring body being vertically movable relative to the rigid base, the spring bodies biasing the spring-loaded platform upward away from the rigid base and against the bottom surface of the cooking platter; and
an insulation pad disposed between the spring-loaded platform and the sensor body.

18. The cooktop appliance of claim 17, wherein the griddle box comprises a bottom wall, and wherein the rigid base is fixed to the bottom wall and extends upwardly therefrom.

19. The cooktop appliance of claim 17, further comprising:
a tube ramp attached to the spring-loaded platform and directed downward therefrom within the box chamber away from the bottom surface; and
a sensor tube extending from the sensor body along the tube ramp.

20. The cooktop appliance of claim 17, further comprising:
a controller in operative communication with the sensor body and the gas burner, and wherein the controller is configured to direct the gas burner based on one or more temperature signals received from the sensor body.

* * * * *